United States Patent
Dalton et al.

(10) Patent No.: US 7,394,488 B2
(45) Date of Patent: Jul. 1, 2008

(54) SYSTEM AND METHOD FOR DUAL WHITE BALANCE COMPENSATION OF IMAGES

(75) Inventors: Dan L. Dalton, Greeley, CO (US); Terry L. Zielke, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 10/697,806

(22) Filed: Oct. 30, 2003

(65) Prior Publication Data

US 2005/0093997 A1    May 5, 2005

(51) Int. Cl.
*H04N 9/73* (2006.01)
*H04N 5/222* (2006.01)

(52) U.S. Cl. .................. 348/223.1; 348/371
(58) Field of Classification Search .............. 358/516; 348/224.1, 227.1
See application file for complete search history.

(56) References Cited

U.S. PATENT DOCUMENTS

| | | | |
|---|---|---|---|
| 5,001,552 A | | 3/1991 | Okino |
| 5,568,194 A | * | 10/1996 | Abe ................. 348/223.1 |
| 5,617,139 A | * | 4/1997 | Okino ............... 348/223.1 |
| 5,808,681 A | * | 9/1998 | Kitajima ............. 348/371 |
| 6,029,013 A | * | 2/2000 | Larkin et al. .......... 396/160 |
| 6,195,127 B1 | | 2/2001 | Sugimoto |
| 6,411,331 B1 | | 6/2002 | Sansom-Wai et al. |
| 6,441,856 B1 | | 8/2002 | Sugimoto |
| 6,529,235 B1 | | 3/2003 | Tseng |
| 6,573,932 B1 | | 6/2003 | Adams, Jr. et al. |
| 6,839,513 B1 | * | 1/2005 | Battles ............... 396/213 |
| 6,982,753 B1 | * | 1/2006 | Udagawa ........... 348/223.1 |
| 7,148,922 B2 | * | 12/2006 | Shimada ............ 348/224.1 |
| 7,212,234 B2 | * | 5/2007 | Sakaguchi et al. .... 348/223.1 |
| 7,342,610 B2 | * | 3/2008 | Okubo ............... 348/371 |
| 2002/0118967 A1 | * | 8/2002 | Funston .............. 396/155 |

* cited by examiner

*Primary Examiner*—Mark Zimmerman
*Assistant Examiner*—Fan Zhang

(57) ABSTRACT

The present invention provides a system and method for compensating captured images. Briefly described, one embodiment comprises white balance compensating a strobed image data and a nonstrobed image data using a first white balance compensation value corresponding to supplemental illumination provided by a supplemental illumination source, determining a difference between the strobed image data compensated with the first white balance compensation value and the nonstrobed image data compensated with the first white balance compensation value, white balance compensating the nonstrobed image data using a second white balance compensation value corresponding to ambient light, and combining the difference to the nonstrobed image white balance compensated using the second white balance compensation value.

29 Claims, 5 Drawing Sheets

SYSTEM AND METHOD FOR DUAL WHITE BALANCE COMPENSATION OF IMAGES

TECHNICAL FIELD

The present invention is generally related to image capture and, more particularly, is related to a system and method for dual white balance compensation of images.

BACKGROUND

Image capture indoors under low ambient lighting conditions typically requires the use of a strobe or flash device to provide supplemental illumination during image capture. Light provided from a strobe or flash device typically has a light characteristic that approximates the characteristics of natural light.

Light characteristics may be described by the color temperature of emitted light. Color temperature corresponds to the temperature of a black-body radiator when light of a certain color characteristic, or hue, is emitted from the black-body radiator. For example, ambient outdoor light on a sunny day at noon exhibits a color temperature of approximately 5,500-6,500 degrees Kelvin (° K.). A burning wax candle exhibits a color temperature of 1,850° K., corresponding to a yellowish hue.

The color temperature of strobes or flash devices are in the 5,000° K. to 6,000° K. range. Incandescent lighting, often used indoors to provide ambient lighting, exhibits a color temperature in the 2,500° K.-2,700° K. range. Incandescent light provides a yellow hue to objects. Fluorescent lighting is another often used indoor lighting source. Fluorescent lighting exhibits a color temperature in the 3,400° K.-4,200° K. range for a "cool white" fluorescent lamp, resulting in a greenish light. Full spectrum fluorescent lamps may exhibit color temperatures to 5,850° K., resulting in more natural light.

When an image is captured indoors in situations wherein ambient light is provided by fluorescent lighting or incandescent lighting, in the absence of supplemental illumination from a strobe or flash device, the captured image will show the objects as having a greenish hue or a yellowish hue, respectively. Accordingly, it is desirable to provide color correction to captured images so that the objects in the captured image appear as they would under natural sunlight conditions.

Filters may be attached to the strobe lens to provide color correction. However, the photographer must have an advanced understanding of lighting theory and image capture techniques to be able to select the appropriate filter for a particular lighting situation.

Special types of film have been developed for film-based image capture devices. Accordingly, the photographer must insert the specialized type of film that is configured to provide color correction for a particular lighting situation. Although such specialized films are easily used by a novice photographer, once loaded, the entire roll of specialized film must be used before lighting conditions change (such that another film type is required). Or if the roll is not used, the roll must be rewound such that the unused film cannot be later used.

Some digital cameras employ color correction algorithms. Such algorithms interpret sensed ambient light conditions at the time of image capture. As the electronic data of the captured image is processed and saved, the captured image data is adjusted to provide appropriate color correction. The correction may be based upon the presence or absence of supplemental illumination provided by a strobe or flash device. Color correction provided by digital cameras is very convenient in that the correction may be automated to a high degree. Accordingly, even a novice photographer can take reasonable quality, color-corrected captured images.

However, none of the above-described techniques of capturing an image using supplemental illumination from a strobe or flash device addresses the effect of the limited distance that the supplemental illumination from a strobe or flash device is cast. Furthermore, with some types of strobes or flash devices, the range of the supplemental illumination is limited in that a lens and/or a reflector is used to project the supplemental illumination in a particular direction.

Accordingly, there may be some regions of the captured image that do not receive any, or relatively little, of the supplemental illumination from a strobe or flash device because these regions are too far away to be lit, or because these regions are not within the projection range of light provided by the strobe or flash device. Such regions will exhibit the hue of the ambient lighting conditions. For example, objects in the background of a captured image may exhibit a yellowish hue when the ambient light on the background region is provided by incandescent lamps. It would be desirable to provide color correction to these regions so that all portions of the captured image exhibit a hue that more closely represents natural lighting conditions.

SUMMARY

The present invention provides a system and method for compensating captured images. Briefly described, one embodiment is a method comprising white balance compensating a strobed image data and a nonstrobed image data using a first white balance compensation value corresponding to supplemental illumination provided by a supplemental illumination source, determining a difference between the strobed image data compensated with the first white balance compensation value and the nonstrobed image data compensated with the first white balance compensation value, white balance compensating the nonstrobed image data using a second white balance compensation value corresponding to ambient light, and combining the difference to the nonstrobed image white balance compensated using the second white balance compensation value.

Another embodiment comprises determining a difference between a strobed image data and a nonstrobed image data, white balance compensating the difference using a first white balance compensation value corresponding to supplemental illumination provided by a supplemental illumination source, white balance compensating the nonstrobed image data using a second white balance compensation value corresponding to ambient light and combining the difference to the nonstrobed image white balance compensated using the second white balance compensation value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The components in the drawings are not necessarily to scale relative to each other. Like reference numerals designate corresponding parts throughout the several views.

DETAILED DESCRIPTION

Figure 1:
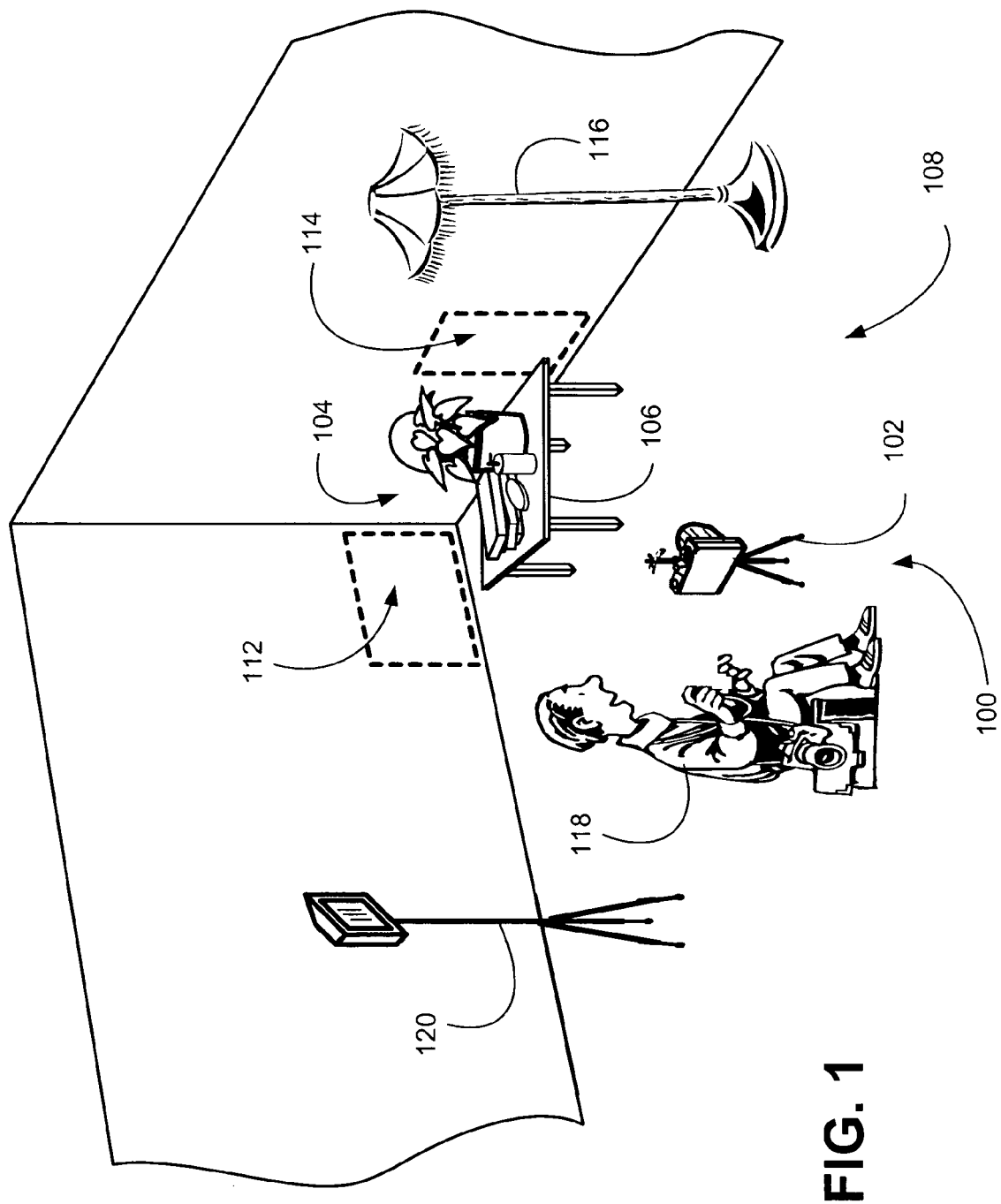
FIG. 1 is an illustrative environment wherein an embodiment of the dual white balance compensation system implemented in an image capture device captures an image illuminated by a flash device and another light source.

FIG. 1 is an illustrative environment wherein an embodiment of the dual white balance compensation system 100 implemented in an image capture device 102 captures an image illuminated by a flash device 318 (FIG. 3) and another light source. Embodiments of the dual white balance compensation system 100 provide dual white balance compensation to captured images when a flash device 318, or another strobe light source, provides supplemental illumination during image capture.

The objects of interest 104 are a plurality of towels, a plant and other objects sitting on top of table 106. The dual white balance compensation system 100 processes captured image data corresponding to a nonstrobed captured image, captured without supplemental illumination from a flash device 318, and strobed captured image, captured with supplemental illumination from the flash device 318. The two images are processed to provide dual white balance compensation in a single generated image. The two images (with and without supplemental illumination from flash device 318) are processed using a first white balance compensation value. Then a differential image contribution is determined. The differential image contribution corresponds to that portion of a captured image attributable to illumination provided by the flash device 318 when the flash device is actuated during image capture. Then, nonstrobed captured image data is processed using a second white balance compensation value. This compensated nonstrobed image data is combined with the differential image contribution. The resultant image, accordingly, has been processed with dual white balance compensation.

Floor lamp 116 provides illumination to room 108. Because the range of illumination provided by floor lamp 116 is relatively limited, the objects of interest 104 and wall portion 114 receive a relatively large amount of illumination from floor lamp 116, as compared to wall portion 112. Floor lamp 116 is assumed to be providing illumination from an incandescent lamp.

Since the objects of interest 104 and wall portion 114 are receiving light from the floor lamp 116, and since wall portion 112 is illuminated primarily from the distant floor lamp 116, the objects of interest 104 and wall portion 114 are illuminated more brightly than wall portion 112.

Furthermore, because of the incandescent lamp providing the illumination from floor lamp 116, which is characterized by a color temperature of 2,500° K.-2,700° K. range, the wall portions 112 and 114, and the objects of interest 104, will be illuminated with some "yellowish" hue.

When a person 118 captures an image of the objects of interest 104, and a background that includes wall portions 112 and 114, portions of the captured image will be poorly illuminated. Accordingly, flash device 318 (FIG. 3) or a remote strobe 120 is actuated to provide supplemental illumination during image capture. The color temperature of the flash device 318 is approximately in the 5,000° K. to 6,000° K. range. Objects illuminated by the flash device 318 will exhibit a color temperature characterized by, in part, the color temperature of the illumination provided by the flash device 318. However, because of the limited distance and the limited projection range that flash device 318 provides illumination to, wall portions 112 and 114 will have relatively less illumination provided by flash device 318 during image capture. Accordingly, wall portions 112 and/or 114 will be relatively less bright than the objects of interest 104. Furthermore, wall portions 112 and 114 will have a yellowish hue since they are illuminated by the floor lamp 116.

FIGS. 2A-F illustrate a series of images A-F processed by embodiments of the dual white balance compensation system 100. The dual white balance compensation system 100 provides dual white balance compensation to captured image data when a flash device 318 (FIG. 3), or another strobe light source, provides supplemental illumination during image capture. For convenience, the phrase "strobe on" refers to image capture when supplemental illumination is provided by actuation of flash device 318, or another strobe light source. The phrase "strobe off" refers hereinafter to image capture when illumination is provided by ambient light sources (no supplemental illumination is provided by the by flash device 318, or another strobe light source). For convenience, the phrase "flash device 318" refers hereinafter to the flash device 318 and/or any other suitable strobe device(s) that when actuated, provides supplemental illumination during image capture.

Embodiments of the dual white balance compensation system 100 successively capture two images with a suitably short interval of time between capture of the two images. An image is captured with supplemental illumination provided by flash device 318 (strobe on), referred to herein as a "strobed" image for convenience. Another image is captured only with ambient light (strobe off), referred to herein as a "nonstrobed" image for convenience. Images may be captured in a "strobe on, strobe off" order, or, images may be captured with a "strobe off, strobe on" order. Since the time between capture of the two images is relatively short, the processed data corresponding to the images may be combined without perceptible image distortion caused by object movement.

Figure 3:
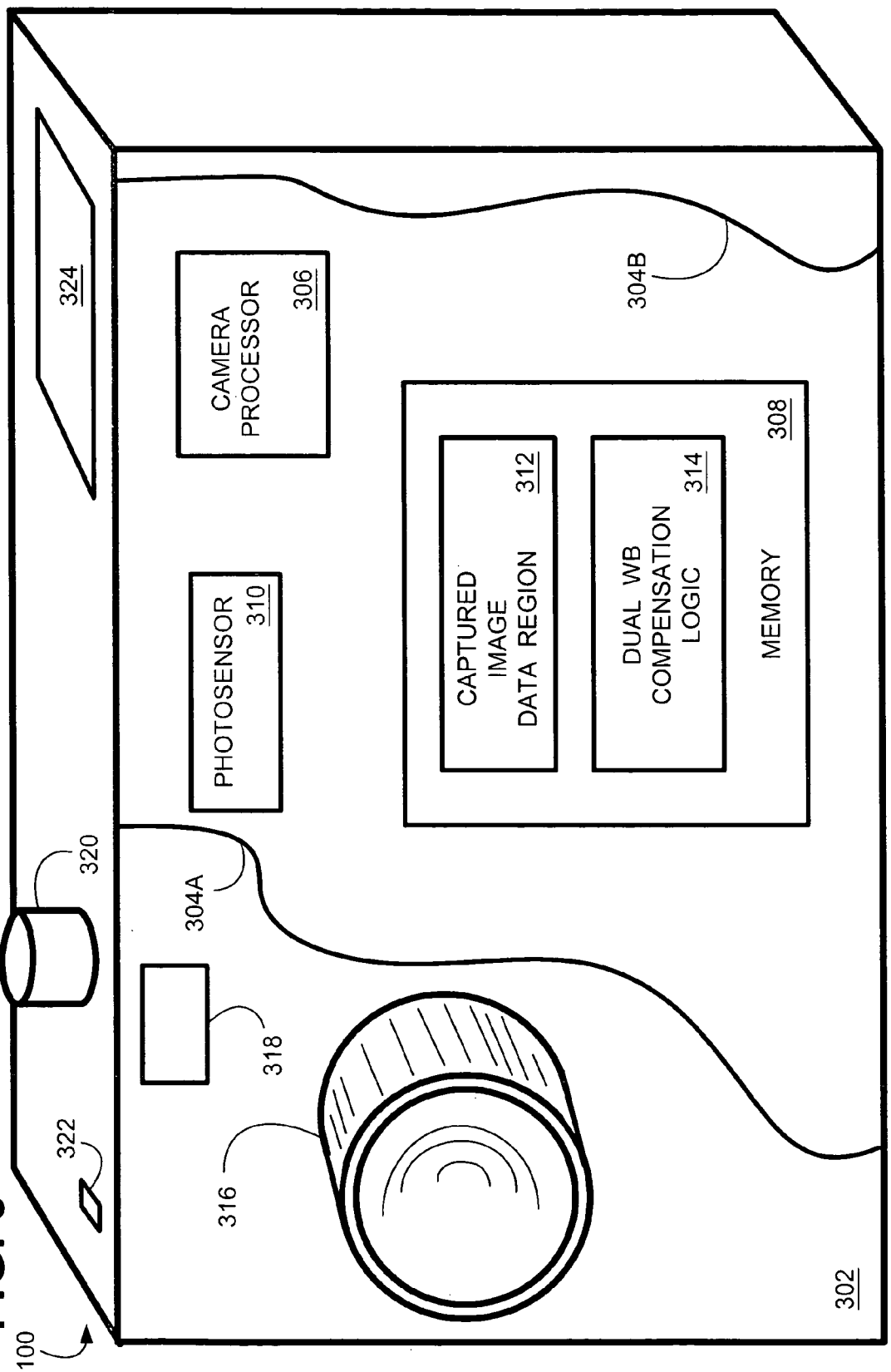
FIG. 3 is a block diagram illustrating an embodiment of a dual white balance compensation system implemented in an image capture device.

Processing captured image data associated with the strobed image and the nonstrobed image may be performed by any suitable white balance compensation algorithm that provides white balance compensation to captured image data. Processing may occur at any suitable point in the image processing stream. Some embodiments of the dual white balance compensation system 100 compensate captured image data by adjusting the value of light information received from pixels in photosensor 310 (FIG. 3). That is, the raw data received from the pixels of photosensor 310 are adjusted before image compression. Thus, a voltage level or a value corresponding to a voltage level from an individual pixel may be adjusted. Other embodiments adjust light information at later points in the data processing pipeline. For example, but not limited to, light information from a plurality of pixels may be processed into data having eight (8) bits or sixteen (16) bits representing red, blue and green color intensities detected by that group of pixels. Accordingly, portions of the 8 bit or 16 bit data is adjusted by embodiments of the dual white balance compensation system 100. As another example, white balance compensation may be performed on compressed Joint Photographics Experts Group (JPEG) formatted data. It is appreciated that any form of data file or data format may be processed at any stage of the data processing pipeline such that image data is compensated by embodiments of the dual white balance compensation system 100.

Figure 2:
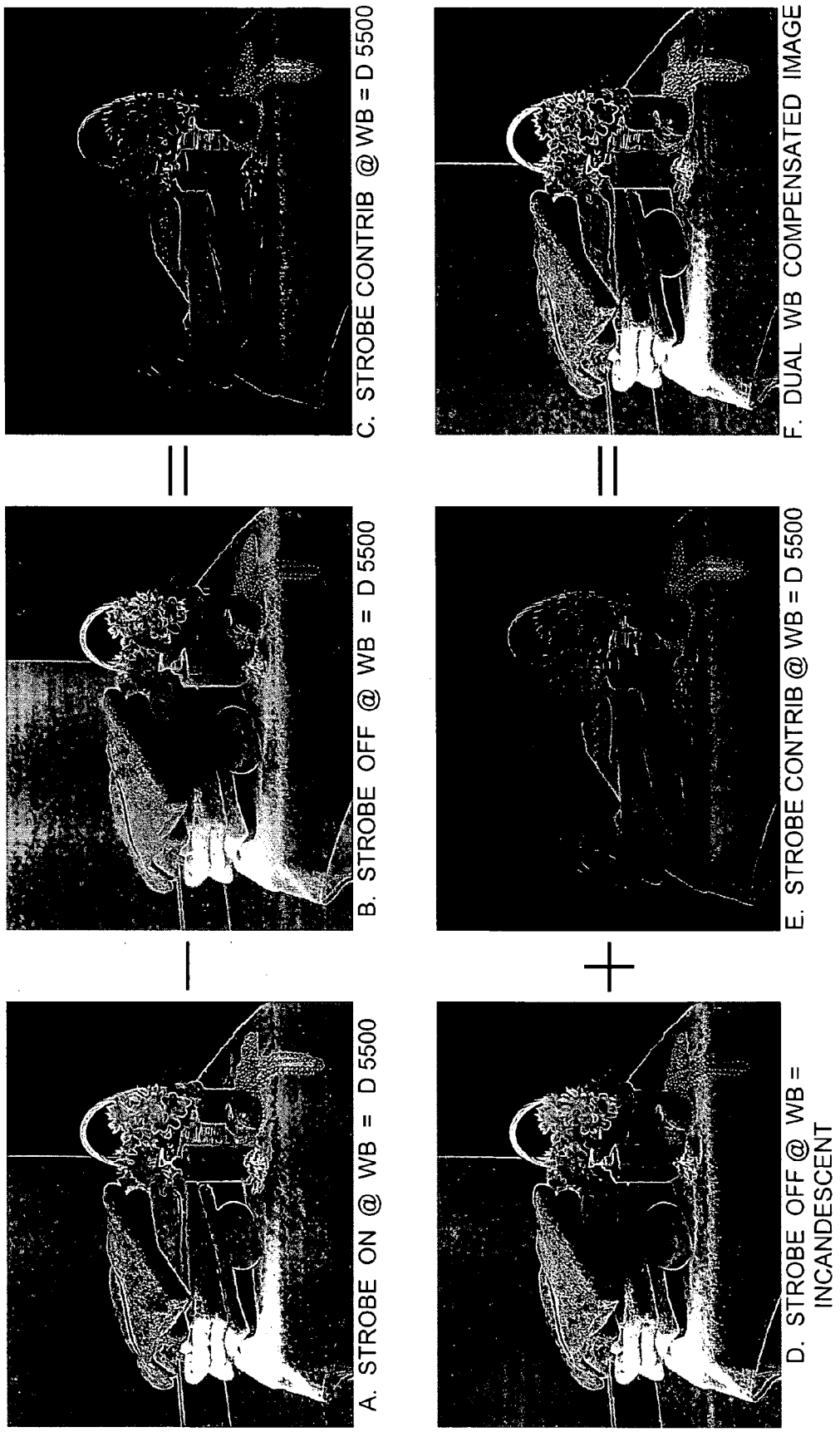
FIGS. 2A-F illustrate a series of images processed by embodiments of the dual white balance compensation system.

FIG. 2A illustrates a "strobed" white balance compensated image using a first white balance color value. The first white balance color value corresponds to the approximate color temperature of the supplemental illumination provided by the flash device 318 (FIG. 3). FIG. 2B illustrates a "nonstrobed" white balance compensated image using the first white balance color value. For illustrative purposes, a value corresponding to 5,500° K. is used as the first white balance color value.

FIG. 2C illustrates a differential image contribution that corresponds to the difference in the compensated strobed image data and compensated nonstrobed image data (each white balance compensated using the first white balance color value). The differential image contribution may be determined at any suitable point in the image processing stream.

FIG. 2D illustrates a nonstrobed white balance compensated image using a second white balance color value. The second white balance color value corresponds to the approximate color temperature of the ambient light. In this illustrative example, ambient light is provided by an incandescent lamp. Accordingly, the second white balance color value corresponds to the approximate color temperature of incandescent light.

FIG. 2E again illustrates the differential image contribution. FIG. 2F is a dual white balance compensated image, generated when the nonstrobed white balance compensated image, compensated using the second white balance color value, is combined with the differential image contribution. The image of FIG. 2F may be generated by combining image data associated with the images of FIGS. 2D and 2E at any suitable point in the image processing stream.

FIG. 3 is a block diagram illustrating an embodiment of a dual white balance compensation system 100 implemented in an image capture device, illustrated for convenience as digital camera 302. Embodiments of the dual white balance compensation system 100 are equally applicable to any electronic device configured to capture images using a strobe or flash device that provides supplemental illumination during image capture. For example, but not limited to, alternative embodiments include digital video cameras, personal digital assistants (PDAs), telephones or computers employing cameras, or other imaging systems.

FIG. 3 illustrates selected external and internal components of a digital camera 302 having an embodiment of the dual white balance compensation system 100. Selected internal components are illustrated between the cut-away lines 304A and 304B. The selected internal components include processor 306, memory 308 and photosensor 310. In one embodiment, memory 308 further includes captured image data region 312 configured to store captured image data, and dual white balance (WB) compensation logic 314 configured to store logic that determines dual white balance compensation for captured images.

Selected external components of digital camera 302 include lens 316, flash device 318, shutter button 320, controller 322 and display 324. For convenience, display 324 is illustrated on the top of digital camera 302. In other embodiments, display 324 is located in another suitable location on the digital camera 302.

Photosensor 310 is disposed in a suitable location behind lens 316 such that an image of the object of interest may be focused onto photosensor 310 for capturing. In one embodiment, display 324 displays a view of an image currently visible through the lens 316 and detected by photosensor 310, referred to herein as a preview image.

Figure 4:
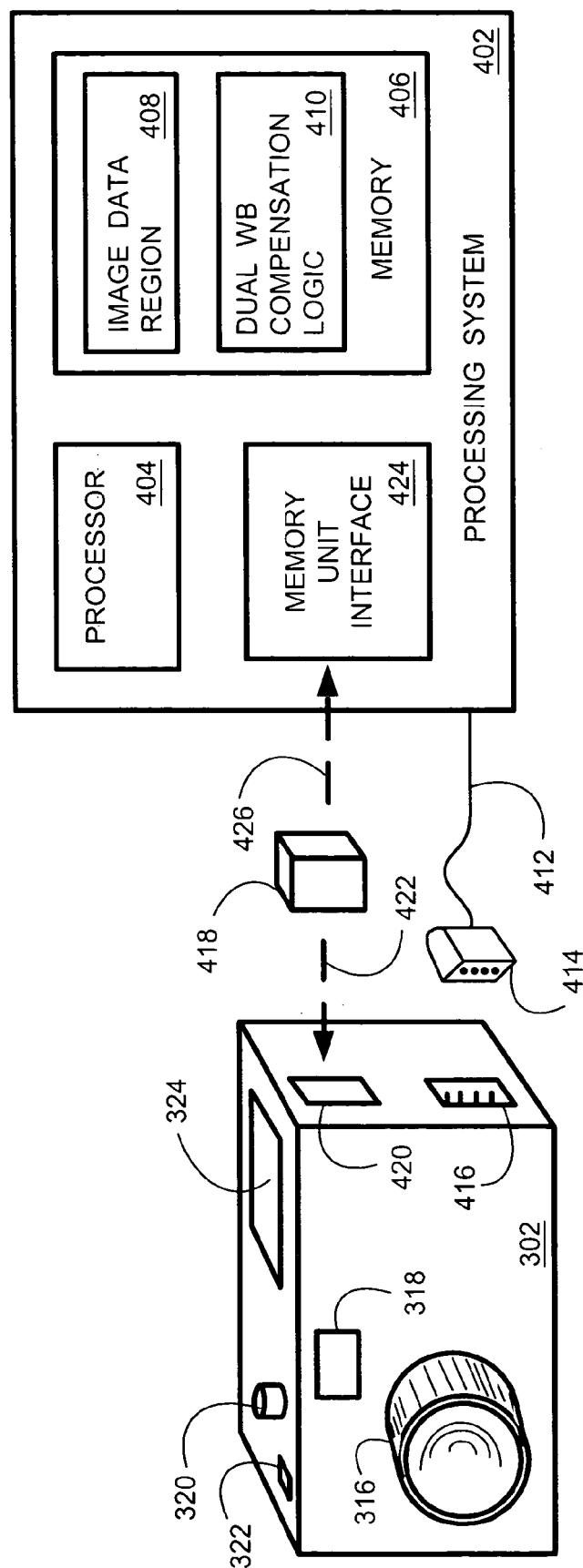
FIG. 4 is a block diagram illustrating an embodiment of a dual white balance compensation system implemented in a processing device.

Prior to capturing an image of the object of interest, the operator of the digital camera 302 views the preview image of the object on display 324. Once the user is satisfied with the nature and characteristics of the preview image, the user actuates the shutter button 320, thereby causing capture of the strobed image and the nonstrobed image. The strobed image and the nonstrobed image, in one embodiment, are saved into the captured image data region 312. In another embodiment, strobed image and the nonstrobed image are saved into a detachable memory unit 418 (FIG. 4).

Processor 306 retrieves and executes the dual WB compensation logic 314. Captured image data, as described above and as illustrated in FIGS. 2A-F, are white balance compensated using a first white balance compensation value and a second white balance compensation value. A differential image contribution is determined from the difference between the "strobed" and the "nonstrobed" captured image data white balance compensated with the first white balance compensation value. For convenience, "strobed" image data corresponds to data generated from the strobed image detected by the photosensor 310 (FIG. 3). The "nonstrobed" image data corresponds to data generated from the nonstrobed image.

The strobed captured image data is compensated with the second white balance compensation value. This compensated strobed captured image data is then combined with the differential image contribution to generate a dual white balance compensated image.

Embodiments employing controller 322 allow a user to selectively activate the dual white balance compensation system 100. When actuated, the dual white balance compensation system 100 compensates captured image data. If not actuated, the image capture device 302 captures the image without dual white balance compensation. In other embodiments, activation of the dual white balance compensation system 100 is implemented as a selectable feature on a menu system or the like. In some embodiments, activation of the dual white balance compensation system 100 is not a selectable feature such that any time an image is captured with supplemental illumination from flash device 318, the dual white balance compensation system 100 automatically compensates captured images.

The dual WB compensation logic 314 includes a plurality of white balance compensation values that correspond to lighting conditions. One white balance compensation value approximately corresponds to the color temperature of the flash device 318. Another white balance compensation value approximately corresponds to the color temperature of the remote strobe 120 (FIG. 1). Another white balance compensation value approximately corresponds to the color temperature of illumination from the floor lamp 116. Yet another white balance compensation value approximately corresponds to the color temperature of illumination from natural light in low light conditions, such as, but not limited to, cloud or overcast conditions, or dusk or dawn conditions. It is appreciated that any preselected white balance compensation value of interest can be included in the dual WB compensation logic 314. Furthermore, in one embodiment, the white balance compensation value is specified by the user.

In one embodiment, the appropriate white balance compensation value is determined based upon an analysis of lighting conditions at the time of image capture. The image data received from photosensor 310 is analyzed to determine lighting conditions and the appropriate white balance compensation value is selected. In another embodiment, controller 322 may be configured to allow the user to select a desired white balance compensation value. In another embodiment, the white balance compensation value is selectable by the user via a menu system.

FIG. 4 is a block diagram illustrating an embodiment of a dual white balance compensation system 100 implemented in a processing system 402. One nonlimiting exemplary embodiment of processing system 402 is a personal computer. Another exemplary embodiment is a laptop computer. Processing device 402 includes a processor 404 and memory 406. Captured image data is stored in the captured image data region 408 of memory 406. When the dual WB compensation logic 410 is executed by processor 404, dual white balance image compensation is provided.

In one embodiment of image capture device 302, image capture device 302 transfers captured image data to processing system 402 via a hard wire connection 412. Connection 412 is coupled to a plug-in attachment 414. Plug-in attachment 414 is configured to connect to plug-in communication interface 416 of the image capture device 302. The user simply connects plug-in attachment 414 to plug-in communication interface 416, thereby establishing connectivity between image capture device 302 and processing system 402. The user then instructs processing system 402 and/or image capture device 302 to transfer digital captured image data from image capture device 302 (residing in the captured image data region 312 of memory 308 shown in FIG. 3) into the image data region 408.

In another embodiment of image capture device 302, captured image data is stored in memory unit 418. When capturing images with image capture device 302, memory unit 418 is coupled to image capture device 302 through memory unit interface 420, as illustrated by dashed line path 422. Captured image data is transferred to processing system 402 by removing memory unit 418 from image capture device 302 and coupling memory unit 418 to memory interface 424. Typically, a convenient coupling port or interface (not shown) is provided on the surface of processing system 402 such that memory unit 418 is directly coupled to processing system 402, as illustrated by dashed line path 426. Once memory unit 418 is coupled to memory interface 424, captured image data is transferred into the image data region 408.

Once the strobed captured image data and the nonstrobed captured image data has been transferred into the image data region 408, processor 404 may then execute the dual WB compensation logic 410 to generate a dual white balance compensated image. In another embodiment, processor 404 executes the dual WB compensation logic 410 to generate a dual white balance compensated image as the strobed captured image data and the nonstrobed captured image data is received from the image capture device 302. Accordingly, a dual white balance compensated image is generated and stored into the image data region 408.

Figure 5:
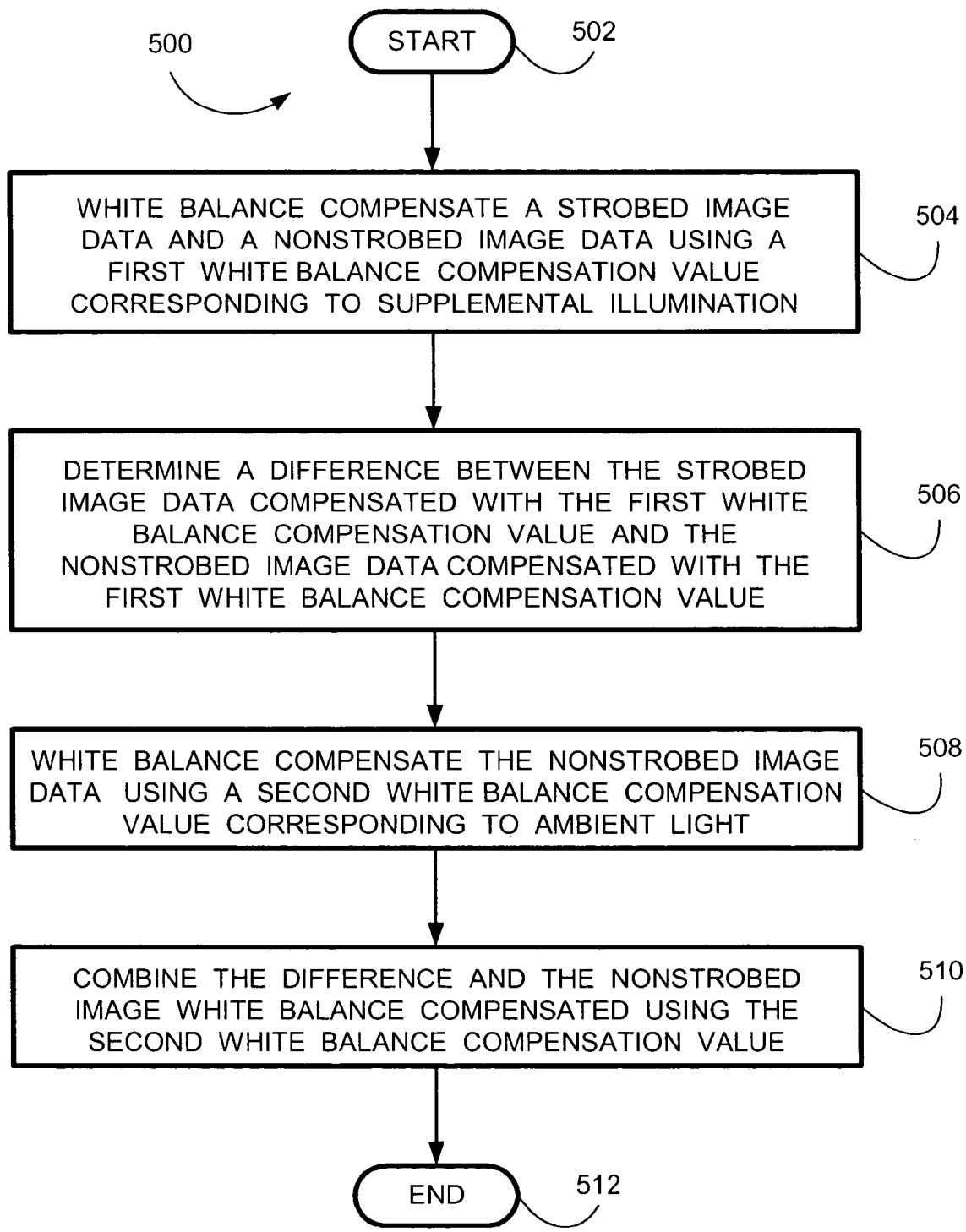
FIG. 5 is a flowchart illustrating an embodiment of a process, according to the present invention, for providing dual white balance compensation to captured images.

FIG. 5 is a flowchart 500 illustrating an embodiment of a process, according to the present invention, for providing dual white balance compensation to captured images. The flow chart 500 of FIG. 5 shows the architecture, functionality, and operation of an embodiment of the dual WB compensation logic 314 (FIG. 3) implemented in image capture device 302 and/or the dual WB compensation logic 410 (FIG. 4) implemented in processing system 403. An alternative embodiment implements the logic of flow chart 500 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIG. 5, or may include additional functions. For example, two blocks shown in succession in FIG. 5 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention The process begins at block 502. At block 504, a strobed image data and a nonstrobed image data is white balance compensated using a first white balance compensation value corresponding to supplemental illumination provided by a supplemental illumination source. At block 506, a difference between the strobed image data compensated with the first white balance compensation value and the nonstrobed image data compensated with the first white balance compensation value is determined. At block 508, the nonstrobed image data using a second white balance compensation value corresponding to ambient light is white balance compensated. At block 510, the difference and the nonstrobed image white balance compensated using the second white balance compensation value are combined. The process ends at block 512.

In another embodiment, a first nonstrobed image is captured under ambient lighting conditions. A second strobed image is captured with additional lighting from a supplemental illumination source, such as the above-described flash device 318 (FIG. 3), remote strobe 120 (FIG. 1), or the like. Images may be captured in a "strobe on, strobe off" order, or, images may be captured with a "strobe off, strobe on" order. A differential image contribution is then determined from the difference between nonstrobed image (ambient lighting only) and the strobed image (with supplemental illumination). The differential image contribution is white balance compensated using the white balance compensation value corresponding to the supplemental illumination. The nonstrobed image is white balance compensated using the white balance compensation value corresponding to the ambient illumination. Then, the compensated differential image contribution is added to the compensated second image.

In the above-described embodiments, the exposure time of the strobed and nonstrobed images are identical or substantially the same. In another embodiment, the exposure times of the strobed image and the nonstrobed image are different. With the strobed image and the nonstrobed images having the same exposure time, the strobe contribution is determined by the difference between the nonstrobed image data and the strobed image data, as described above. However, if the strobed image has a different exposure time, the equations below allow determination of the differential image contribution:

$I_n$ = Nonstrobed image    $T_n$ = Nonstrobed image exposure time
$I_s$ = Strobed image    $T_s$ = Strobed image exposure time
Differential Image contribution = $I_s - (I_n * (T_s/T_n))$ Accordingly, when the differential image contribution is determined, the nonstrobed image data is scaled by the ratio of the strobed image exposure time to the nonstrobed image exposure time.

Embodiments of the invention implemented in memory 308 (FIG. 3) and/or memory 406 (FIG. 4) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

It should be emphasized that the above-described embodiments are merely examples of implementations. Many variations and modifications may be made to the above-described embodiments. All such modifications and variations are intended to be included herein within the scope of this disclosure and protected by the following claims.

Therefore, having thus described the invention, at least the following is claimed:

1. A system which compensates captured images comprising:
    a photosensor that captures a nonstrobed image under an ambient lighting condition and captures a strobed image illuminated with supplemental illumination;
    an illumination source actuated to provide the supplemental illumination; and
    a processor configured to generate a strobed image data corresponding to the strobed image and a nonstrobed image data corresponding to the nonstrobed image, configured to white balance compensate the strobed image data and the nonstrobed image data using a first white balance compensation value corresponding to the supplemental illumination, configured to determine a difference between the strobed image data and the non strobed image data, each data compensated with the first white balance compensation value, configured to white balance compensate the nonstrobed image data using a second white balance compensation value corresponding to the ambient lighting conditions, and configured to add the difference to the nonstrobed image data compensated using the second white balance compensation.

2. The system of claim 1, wherein the supplemental illumination comprises a flash device.

3. The system of claim 1, wherein the supplemental illumination comprises a strobe.

4. The system of claim 1, wherein the supplemental illumination comprises a remote strobe.

5. The system of claim 1, wherein the system is a digital camera.

6. A method for compensating captured images, the method comprising the steps of:
    white balance compensating a strobed image data and a nonstrobed image data using a first white balance compensation value corresponding to supplemental illumination provided by a supplemental illumination source;
    determining a difference between the strobed image data compensated with the first white balance compensation value and the nonstrobed image data compensated with the first white balance compensation value;
    white balance compensating the nonstrobed image data using a second white balance compensation value corresponding to ambient light; and
    combining the difference to the nonstrobed image white balance compensated using the second white balance compensation value.

7. The method of claim 6, further comprising the step of generating a compensated image data corresponding to an image with dual white balance compensation.

8. The method of claim 6, further comprising the steps of: capturing the nonstrobed image without the supplemental illumination; and capturing the strobed image with the supplemental illumination.

9. The method of claim 8, wherein the step of capturing is performed with an image capture device.

10. The method of claim 8, further comprising the steps of: generating the strobed image data from the strobed image; and generating the nonstrobed image data from the strobed image.

11. The method of claim 8, further comprising the step of providing the supplemental illumination when the strobed image is captured.

12. The method of claim 11, wherein the step of providing the supplemental illumination further comprises the step of actuating a flash device.

13. The method of claim 11, wherein the step of providing the supplemental illumination further comprises the step of actuating a strobe.

14. The method of claim 11, wherein the step of capturing further comprises the steps of: first capturing the strobed image; and then capturing the nonstrobed image.

15. The method of claim 11, wherein the step of capturing further comprises the steps of: first capturing the nonstrobed image; and then capturing the strobed image.

16. The method of claim 11, wherein the step of capturing is performed with a sufficiently short duration of time between the capture of the strobed image and the nonstrobed image such that when the step of determining the difference results in no discernable image distortion caused by movement of at least one object.

17. The method of claim 6, further comprising the step of receiving the strobed image data and the nonstrobed image data from a memory.

18. The method of claim 6, further comprising the step of specifying the first white balance compensation value corresponding to the supplemental illumination.

19. The method of claim 6, further comprising the step of specifying the second white balance compensation value corresponding to the ambient light.

20. The method of claim 6, further comprising the steps of: analyzing an ambient lighting condition; and selecting the second white balance compensation value corresponding to the ambient lighting condition.

21. The method of claim 6, further comprising the steps of: analyzing a supplemental illumination condition; and selecting the first white balance compensation value corresponding to the supplemental illumination condition provided by the supplemental illumination source.

22. The method of claim 6, further comprising the step of specifying the second white balance compensation value corresponding to illumination provided by another illumination source.

23. The method of claim 6, further comprising the step of specifying the first white balance compensation value corresponding to illumination provided by the supplemental illumination source.

24. The method of claim 6, wherein the step of determining a difference further comprises the step of scaling the nonstrobed image data by the ratio of a strobed image exposure time to a nonstrobed image exposure time.

25. A system for compensating images, comprising:
    means for white balance compensating a strobed image data and a nonstrobed image data using a first white balance compensation value corresponding to supplemental illumination provided by a supplemental illumination source;

means for white balance compensating the nonstrobed image data using a second white balance compensation value;

means for determining a difference between the strobed image data and the nonstrobed image data compensated with the first white balance compensation value; and means for combining the difference to the nonstrobed image data compensated using the second white balance compensation value.

26. The system of claim 25, further comprising means for capturing a strobed image corresponding to the strobed image data and capturing a nonstrobed image corresponding to the nonstrobed image data.

27. A computer-readable medium encoded with a computer program for compensating images; and when executed by a computer, the program comprising logic configured to perform the steps of:

receiving data corresponding to a strobed image data and a nonstrobed image data;

white balance compensating the strobed image data and the nonstrobed image data using a white balance compensation value corresponding to supplemental illumination provided by a supplemental illumination source;

determining a difference between the compensated strobed image data and the compensated nonstrobed image data;

white balance compensating the nonstrobed image data using a second white balance compensation value corresponding to an ambient lighting condition; and combining the difference to the nonstrobed image data compensated using the second white balance compensation value.

28. A method for compensating captured images, the method comprising the steps of:

determining a differential image contribution as a difference between a strobed image data and a nonstrobed image data;

white balance compensating the difference using a first white balance compensation value corresponding to supplemental illumination provided by a supplemental illumination source;

white balance compensating the nonstrobed image data using a second white balance compensation value corresponding to ambient light; and combining the differential image contribution to the nonstrobed image white balance compensated using the second white balance compensation value.

29. The method of claim 28, further comprising the steps of:

capturing a strobed image with the supplemental illumination;

generating the strobed image data from the strobed image;

capturing a nonstrobed image without the supplemental illumination; and generating the nonstrobed image data from the strobed image.

* * * * *

UNITED STATES PATENT AND TRADEMARK OFFICE
CERTIFICATE OF CORRECTION

PATENT NO. : 7,394,488 B2 Page 1 of 1
APPLICATION NO. : 10/697806
DATED : July 1, 2008
INVENTOR(S) : Dan L. Dalton et al.

It is certified that error appears in the above-identified patent and that said Letters Patent is hereby corrected as shown below:

In column 9, lines 32-33, in Claim 1, delete "non strobed" and insert -- nonstrobed --, therefor0.

Signed and Sealed this

Twelfth Day of May, 2009

JOHN DOLL
*Acting Director of the United States Patent and Trademark Office*